United States Patent [19]

Döber et al.

[11] Patent Number: 5,090,889
[45] Date of Patent: Feb. 25, 1992

[54] INJECTION BLOW TOOL FOR SYNTHETIC PLASTIC INJECTION CASTING MACHINES

[75] Inventors: Walter Döber; Heinz Oettinger, both of Badurach-Seeburg, Fed. Rep. of Germany

[73] Assignee: Systec Engineering Knauer GmbH & Co. KG, Bad Urach, Fed. Rep. of Germany

[21] Appl. No.: 551,556

[22] Filed: Jul. 11, 1990

[51] Int. Cl.⁵ ............................................. B29C 49/06
[52] U.S. Cl. .................... 425/522; 425/526; 425/533; 425/534; 425/DIG. 13
[58] Field of Search ....... 425/534, 533, 522, DIG. 13, 425/526

[56] References Cited

U.S. PATENT DOCUMENTS

| | | | |
|---|---|---|---|
| 2,789,312 | 4/1957 | Borer | 425/534 X |
| 3,754,068 | 8/1973 | Fattori | 264/538 |
| 3,838,961 | 10/1974 | Yogosawa et al. | 425/526 |
| 3,887,316 | 6/1975 | Hestehave | 425/534 X |
| 3,941,539 | 3/1976 | Saumsiegle et al. | 425/534 X |
| 4,427,359 | 1/1984 | Fukuoka et al. | 425/533 X |
| 4,615,667 | 10/1986 | Roy | 425/533 X |
| 4,846,656 | 7/1989 | Denis et al. | 425/DIG. 13 |

FOREIGN PATENT DOCUMENTS

2521308 11/1975 Fed. Rep. of Germany.

Primary Examiner—Richard L. Chiesa
Attorney, Agent, or Firm—Michael J. Striker

[57] ABSTRACT

An injection blow tool for synthetic plastic injection casting machine has a casting matrix with a plurality of casting molds, an associated matrix movable relative to the casting matrix and provided with mold cores corresponding to the casting molds, the matrix with the mold cores being formed as a turning body, a support supporting the turning body turnable about a turning angle of at least 90° relative to the casting matrix, the support being arranged between the casting matrix and a displaceable blow matrix so that mold cores arranged at a side of the turning body are inserted in the casting molds of the casting matrix and mold cores arranged at the opposite side of the turning body are simultaneously inserted in the blowing molds of the blowing matrix, and simultaneously an injection casting process step and a blowing process step are performed.

20 Claims, 6 Drawing Sheets

INJECTION BLOW TOOL FOR SYNTHETIC PLASTIC INJECTION CASTING MACHINES

BACKGROUND OF THE INVENTION

The present invention relates to an injection blow tool for synthetic plastic injection casting machines. More particularly, it relates to such an injection blow tool which has a casting matrix with several casting molds and a matrix movable relative to the casting matrix and provided with several mold cores corresponding to the several casting molds.

The injection blow tools for synthetic plastic injection casting machines can be further improved.

SUMMARY OF THE INVENTION

Accordingly, it is an object of the present invention to provide an injection blow tool with which conventional synthetic plastic injection casting machines can be equipped afterwards and with which simultaneously several workpieces can be injected and several workpieces can be finally blown to their final form.

In keeping with these objects and with others which will become apparent hereinafter, one feature of the present invention resides, briefly stated, in an injection blow tool in which the matrix with the mold cores is formed as a turning body turnable over a turning angle of at least 90°, particularly 2×90°, on a support which is displaceable relative to the casting matrix and arranged between the casting matrix and a similarly displaceable blowing matrix so that simultaneously the mold cores arranged at one side of the turning body are inserted in the casting molds of the casting matrix and the mold cores arranged at the opposite side of the turning body are inserted into blow molds of the blow matrix, and simultaneously an injection casting process step and a blow process step are performed.

In accordance with a preferable embodiment of the invention, the casting matrix can be provided on two opposite sides with casting molds, and one turning body carrying the mold cores and a blow matrix can be associated with each of said sides. The turning body or the turning bodies can be formed in an advantageous manner as beams which are turnable about their longitudinal axes and provided at opposite sides respectively with a row of mold cores. In this way small turning radii for the movable masses are obtained so that a fast movement of the tool parts is achieved. Moreover, the beam-shaped turning body for the mold cores provides for a substantially space-consuming construction of the tool, so that several layers of the mold cores can be arranged in a low structural height.

The injection blow tool formed in accordance with the present invention can be arranged with its displaceable turning body for the mold cores and blow matrixes and together with at least one stationary casting matrix, in a common supporting frame mountable exchangeably on an injection machine. The constructions of the mold cores and the casting molds and the blowing molds can be different. Also, the tool can be provided with different withdrawing devices. For example, at least one turning body for the mold cores of the tool can be turned by 90° relative to the casting matrix or one blow matrix can be brought to the offset workpiece withdrawing or workpiece discharging position in which a finished workpiece can be blown off or removed by a gripping device. Also, the blowing matrixes can be turned when needed by at least 90° to a withdrawal position.

The mold cores can be preferably electrically heatable, assembled from several parts which are displaceable relative to one another for orientation of the workpiece, and partially formed by sliders. Advantageously, the casting molds and/or the blow molds can be inserted in the matrixes in an exchangeable manner.

The output of the inventive injection blow tool is substantially higher than that of known injection blow tools. It can be practically doubled for simple injection blow tool, when the tool for each turning body for molding cores is provided at its periphery with two casting matrixes offset by 90° relative to one another and two blow matrixes offset by 90° relative to one another, or in other words each turning body is formed as a four element station.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
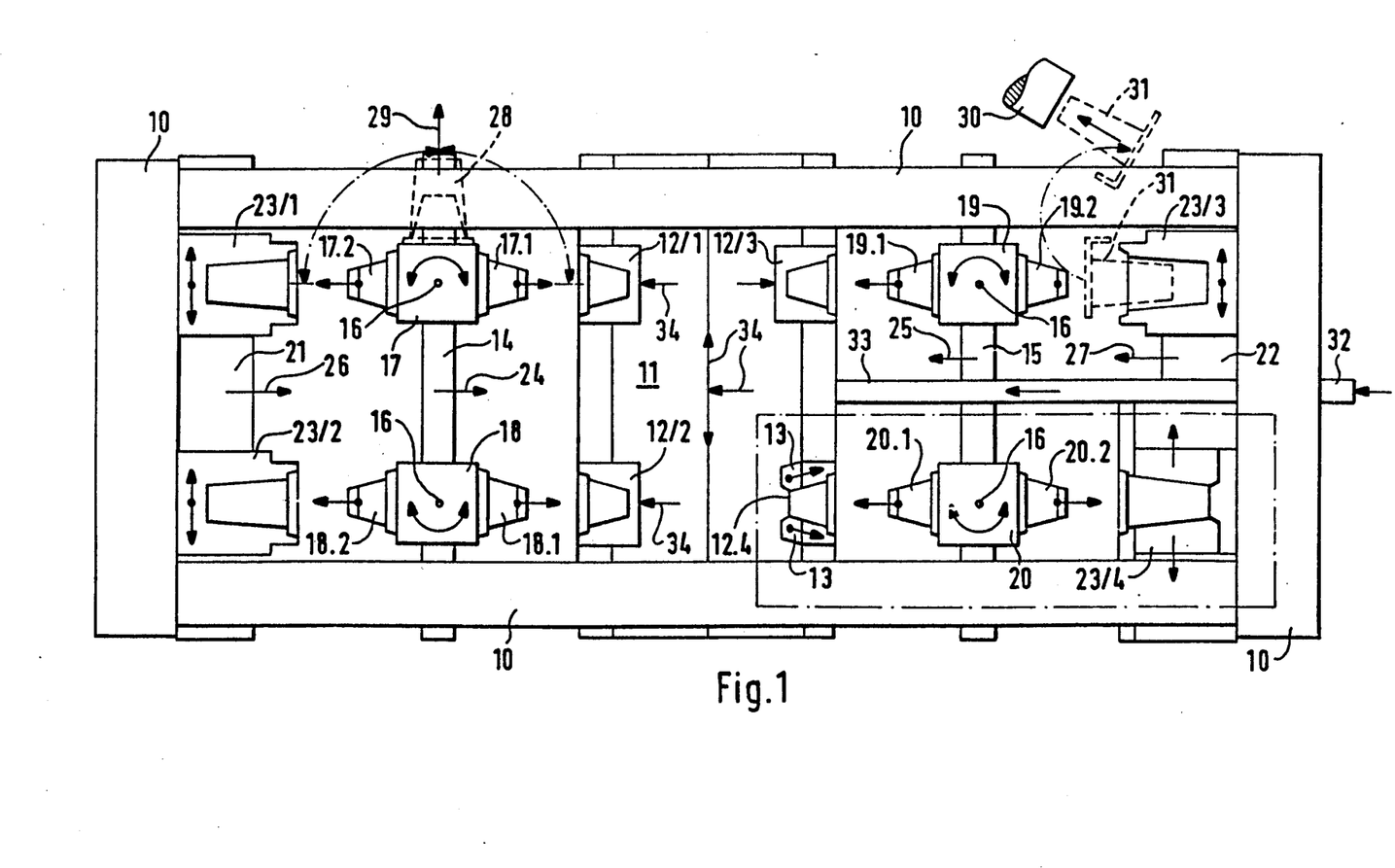
FIG. 1 is a view showing an injection blow tool in accordance with the present invention with open molds.

An injection blowing tool is shown in FIG. 1 and has a supporting frame which is identified with reference numeral 10. The supporting frame can be mounted on a not shown, conventional injection casting machine. A casting matrix 11 is stationarily arranged in the frame 10 and provided with four rows of exchangeable casting molds 12/1, 12/2, 12/3 and 12/4 extending perpendicularly to the plane of the drawings. The casting molds of the individual casting mold rows can be designed differently. For example, the casting molds 12/4 can be formed as molds which are limited from outside by movable sliders 13. The casting matrix 11 has several levels, in which from each of the four casting mold rows, a casting mold 12/1-12/4 is arranged, respectively.

A support 14 and 15 provided respectively at both sides of the stationary casting matrix 11 with the exchangeable casting molds 12/1-12/4 is movably mounted in the frame 10. Two matrixes in form of beams 17, 18, 19 and 20 are arranged on the support turnably about their longitudinal axes 16. Two additional supports 21 and 22 which are movable in the same direction as both supports 14 and 15 supporting the turning beams 17–20, are arranged in both end regions of the frame 10. They have respectively two rows of blowing molds 23/1 and 23/2 or 23/3 and 23/4. The beam beam supports 14 and 15 can moved from the shown open position of the tool in direction of the arrows 24 and 25 to the stationary casting matrix 11, until the mold cores 17.1, 18.1, 19.1 and 20.1 are inserted into respective casting molds 20/1, 20/2, 20/3, 20/4. Simultaneously both blow matrix supports 21 and 22 can move in direction of the arrows 26 and 27 in direction to the stationary casting matrix 11, until the mold cores 17.2, 18.2, 19.2 and 20.2 of the turning beams 17–20 are inserted in the blow molds 23/1, 23/2 or 23/3 and 23/4.

In the open position of the tool shown in FIG. 1, the turning beams 17–20 can turn about their longitudinal axes 16 by 180°, for bringing the workpieces sitting on the mold cores 17.1, 18.1, 19.1 and 20.1 and formed in the casting molds 12 of the casting matrix 11, into the action region of the blow matrixes 21 and 22. As can be seen on the turning beam 17, the turning beams 17–20 can be turned in 90° steps, for bringing finally blown workpieces 28 sitting on the mold core 17.2 to a throwing or discharge position. There they can be blown away in direction of the arrow 29, for example from the turning beam 17. Also, special removing tools 30 can be provided for removal of the finished workpiece. One of such removing tools is shown in the region of the turning beam 19 and serves for withdrawal of finally blown workpiece 31.

In deviation from the arrangement shown in FIG. 1, two casting matrixes which are offset relative to one another by 90° and two blowing matrixes which are offset relative to one another by 90° can be arranged for each turning beam 17–20 at its periphery. Therefore a higher workpiece number per manufacturing cycle can be obtained.

As mentioned hereinabove, the casting matrix 11 can be provided with different casting molds 12. In correspondence with this, also the blowing matrixes can be provided with differently designed blowing molds 23/1–23/4. In FIG. 1 all blowing molds are shown as multi-part openable molds. FIG. 1 also shows the end position 32, through which synthetic plastic material is introduced from a not shown synthetic plastic injection casting machine into a conduit 33. The conduits leads to the stationary casting matrixes 11 in which the synthetic plastic material is distributed in direction of the arrow 34 to the individual casting molds 12/1–12/4.

Figure 2:
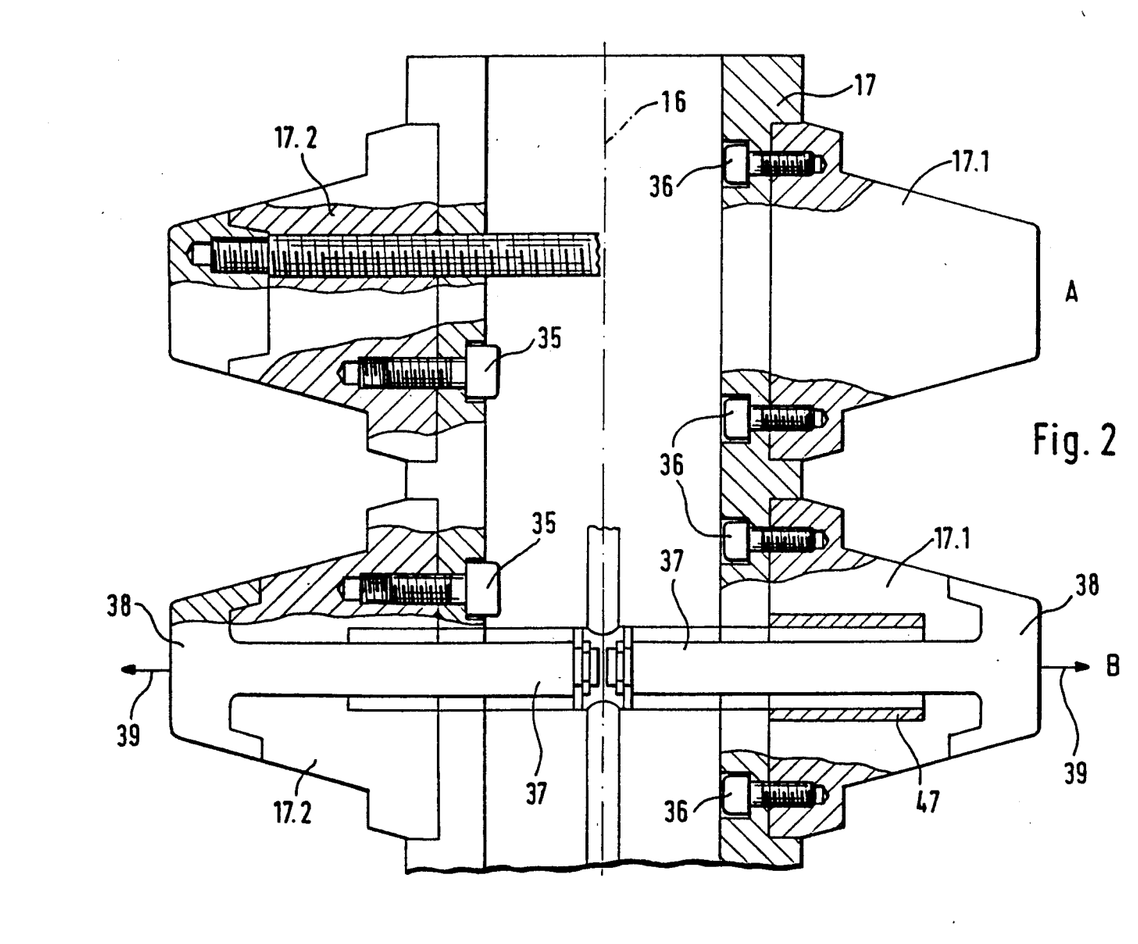
FIG. 2 is a view showing an upper part of a beam-shaped turning body for mold cores with different mold cores.

FIG. 2 shows the upper end of one of the turning beams 17–20. Two mold cores 17.1 and 17.2 from both mold cores rows are shown at the opposite sides of the turning beam 17. They are releasably mounted by screws 35 or 36 on the rotary beam 17 formed as a hollow body. The both mold cores 17.1 and 17.2 arranged in the uppermost level A are normally identical and shown as different mold cores only to illustrate the plurality of mold cores bringable on the turning beams 17–20. The mold cores 17.1 and 17.2 arranged in the second layer B are each provided with an injection part 38 connected with a lifting rod 39 and movable away from the part of the mold core 17.2 screwed on the turning beam 17 for pre-orientation of a casting workpiece formed on it in direction of the arrow 39. For this purpose, not shown drive units for the lifting rods 27 are provided in the interior of the turning beam 17. A heating coil 47 for electrical heating of the mold core is located on one of the mold cores 17.1.

Figure 3:
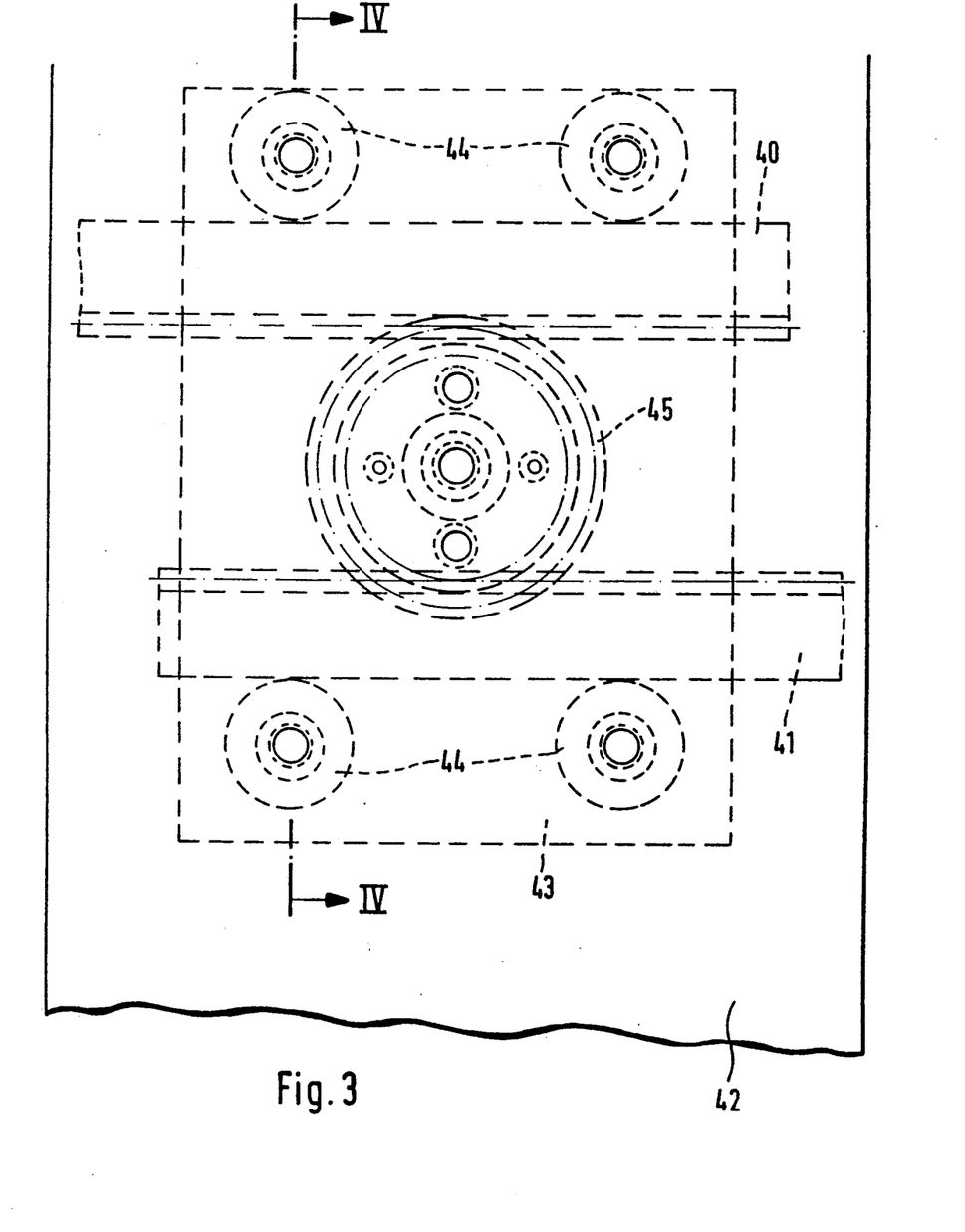
FIG. 3 is a partial view of a drive device for the displaceable support for mold core-turning body and the blowing matrixes.
Figure 4:
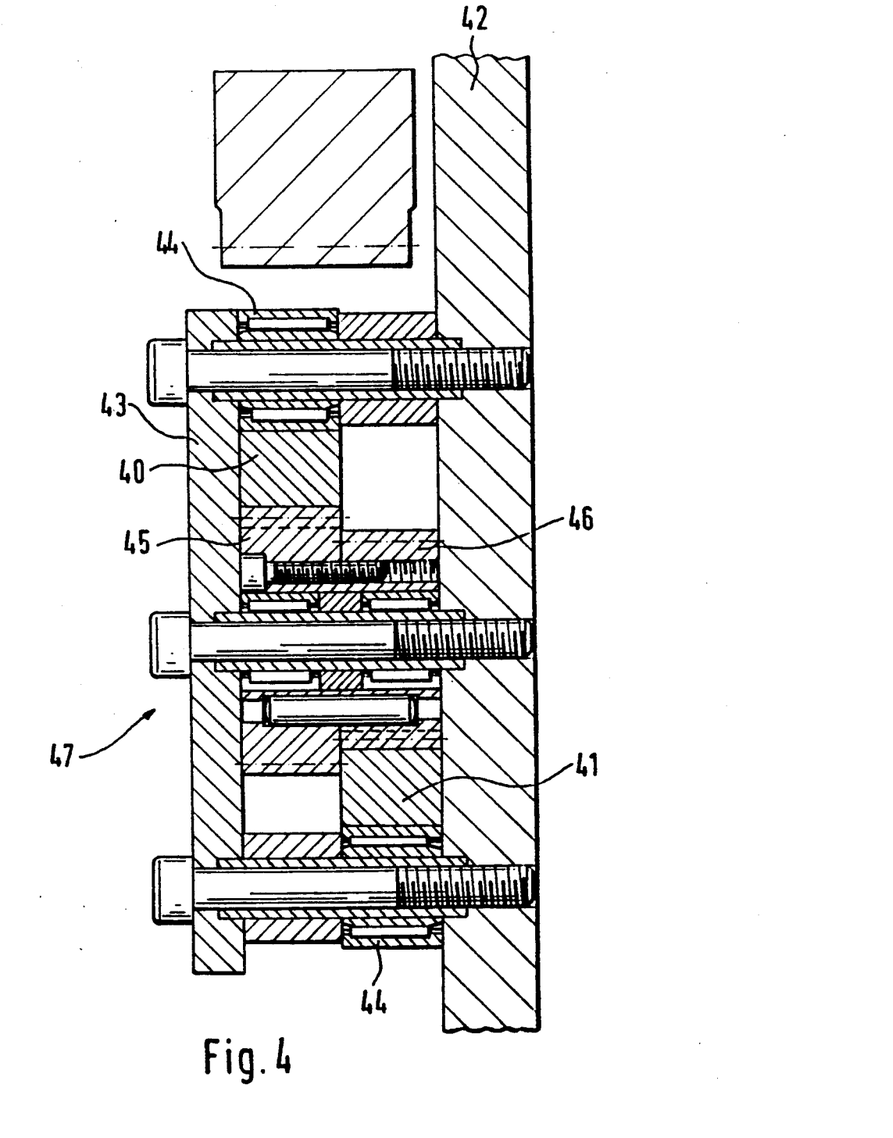
FIG. 4 is a view showing a section of the drive part shown in FIG. 3, taken along the line IV—IV in FIG. 3.

The displacement movement of the turning beam supports 14, 15 and the blow matrix supports 21 and 22 and the turning movement of the turning beams 17–20 can be performed by special displacement motors and by means of a joint control device for these motors. The drive of these parts can be provided from a joint drive motor through toothed racks and/or control cams. FIGS. 3 and 4 show a part of the toothed rack drive with a toothed rack 40 for movement of a blow matrix support 21 and a toothed rack 41 for transmitting the drive movement of the toothed rack 40 to the associated turning beam support 14. Both toothed racks 40 and 41 are arranged between plates 42 and 43 of a toothed wheel box 47 of the frame 10 and each guided along the same by ball bearings 44. The toothed rack 40 engages with a toothed wheel 45 of a greater diameter, which is fixedly coaxially connected with the toothed wheel 46 of a smaller diameter, which in turn engages with the toothed rack 41. Different opening strokes at the injection side and at the blow side of the tool can be obtained by the utilization of different teeth modules. Also, for this purpose the toothed wheels can be exchanged by toothed drives.

Figure 5:
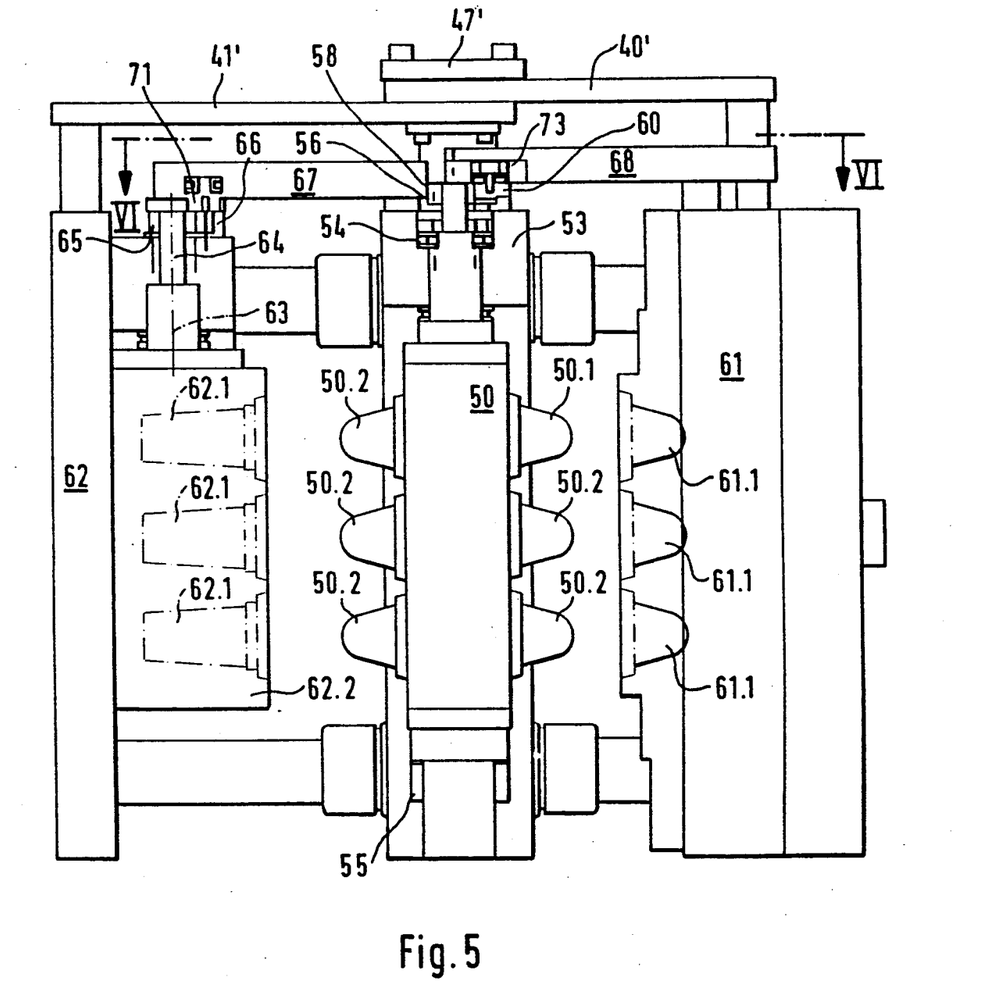
FIG. 5 is a schematic side view of the injection blow tool with two turning bodies with respectively six mold cores.
Figure 6:
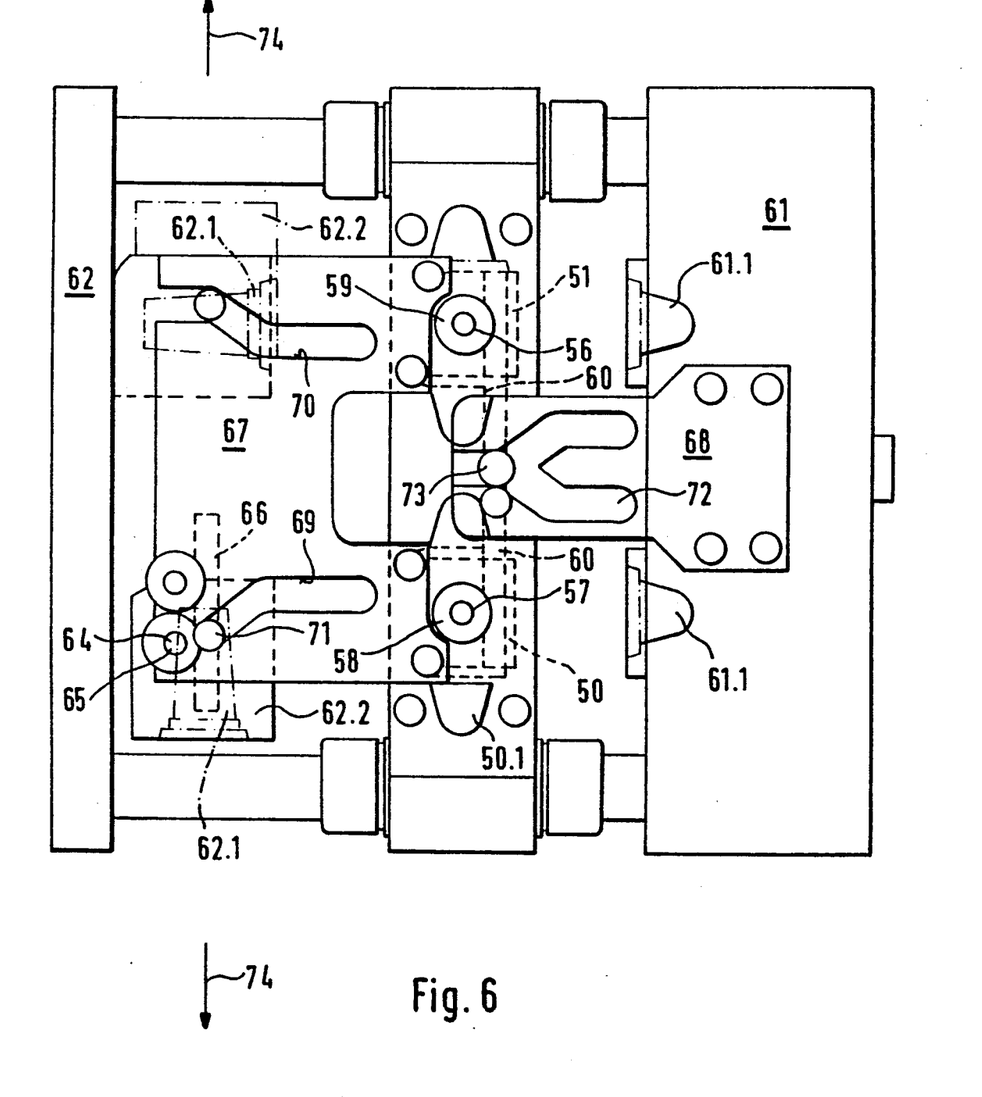
FIG. 6 is a view showing a section along the line VI—VI in FIG. 5 with a plan view of curved plates of the drive part of the tool, to control the movable parts.

FIGS. 5 and 6 show another embodiment of an injection-blow tool. Here, two turning bodies 50 and 51 shown in FIG. 5 are provided at opposite sides with three mold cores 50.1 and 50.2 arranged over the other. As can be seen from FIG. 6 they are arranged near one another with a distance in a stationary support 53. In FIG. 5 the upper rotary bearing point 54 and the lower rotary bearing point 55 of the turning body 50 are shown. Each turning body ends in an upper shaft pin 56 or 57, on which a toothed pinion 58 or 59 is mounted. A toothed rack 60 which is longitudinally displaceable supported on the stationary support 53 engages with both toothed pinions 58 and 59.

A longitudinally displaceable support 61 with casting matrixes 61.1 is located on one side of the stationary support 53. A longitudinally displaceable support 62 with blowing matrixes 62.1 is located at the other side of the stationary support. The blow matrixes 62.1 are arranged in the support 62 turnably about a vertical axis 63. The part 62.2 containing the blow matrix 62.1 ends in an upper shaft pin 64 provided with a toothed pinion 65. The toothed pinion 65 engages with a toothed rack 66 supported on the support 62.

The longitudinal displacement of both supports 61 and 62 is performed by a toothed drive described in connection with FIGS. 3 and 4. The toothed wheel box 47' is arranged here on the stationary support 53. One toothed rack 40' of the toothed drive is fixedly connected with the longitudinally displaceable support 61. The other toothed rack 41' is fixedly connected with the longitudinally displaceable support 62. A first control plate 67 mounted on the stationary support 63 and a second control plate 68 mounted on the longitudinally displaceable support 61 are provided for the drive control. A control curve 69 or 70 is formed in the first control plate 76 for each of both matrix holders 62.2 of the support 62. A roller 71 arranged on the longitudinally displaceably supported toothed rack 66 engages with the control curve 69 or 70. A fork-shaped control curve 72 is formed in the second control plate. A roller 73 arranged on the longitudinally displaceably supported toothed rack 60 engages with the control curve 72.

The injection blow tool is shown in FIGS. 5 and 6 in the opening condition. Both blow matrix holders 62.2 are turned in the withdrawal position shown below in FIG. 6. In this position the blown workpieces can be blown out from the matrixes in direction of the arrow 74. The operational position of the blow matrix holder 62.2 turned by 90° is shown in FIG. 5 and in FIG. 6 above. In this opening position both turning bodies 50 and 51 of the stationary support 53 with their mold cores 50.1 are located in opposition which is turned 90° relative to the operational position shown in FIG. 1. When now both longitudinally displaceable supports 61 and 62 are moved through the toothed racks 40' and 41' with speed predetermined by the toothed wheels of the toothed wheel box 47' which is for example a different speed, on the stationary support 53 thereby in the closing direction of the tool, the toothed racks 66 are displaced by the rollers 71 running on the control curve 69 and 70. Thereby the matrix support 62.2 is turned back by 90° to the operating position shown in FIG. 5. During the displacement movement of the support 61, the roller 73 runs in a branch of the fork-shaped control curve 72 of the second control plate 68. The thusly produced displacement of the toothed rack 60 causes a turning of both turning bodies 50 and 51 by 90° to the operational position shown in FIG. 5. The turning bodies can be turned by 90° in the same direction by both branches of the fork-shaped control curve 72, by means of not shown integrated slider in the curved plate 68. This is the direction in which they were turned during the preceding opening stroke. During opening of the mold, the workpieces which are cast in the embodiment of FIGS. 5 and 6 in the casting matrixes 61.1 and sit on the mold cores 50.1 are turned to the position shown in FIG. 6. Simultaneously, in the closing position of the tool, the workpieces finally blown in the blow matrixes 62.1 and remaining in the matrixes are brought to the throwing out position shown in FIG. 6 and thrown out in direction of the arrow 74. During the next closing process of the tool, the precast workpieces sitting on the mold core 50.1 are turned by 90° further in direction to the blowing matrix support 62.2 and finally blown in the blow matrixes 62.1. Simultaneously, new workpieces are cast on the opposite mold cores 50.1 in the cast matrixes 62.1.

It will be understood that each of the elements described above, or two or more together, may also find a useful application in other types of constructions differing from the types described above.

While the invention has been illustrated and described as embodied in an injection blow tool for synthetic plastic injection casting machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An injection blow tool for synthetic plastic injection casting machine, comprising a casting matrix with a plurality of casting molds; an associated matrix movable relative to said casting matrix and provided with mold cores corresponding to said casting molds, said matrix with said mold cores being formed as a turning body; a support supporting said turning body turnable about a turning angle of at least 90° relative to said casting matrix, said support being arranged between said casting matrix and a displaceable blow matrix with a plurality of blow molds so that mold cores arranged at a side of said turning body are inserted in said casting molds of the casting matrix and mold cores arranged at the opposite side of said turning body are simultaneously inserted in said blow molds of said blow matrix, and means for simultaneously performing injection casting and blow molding; a drive mechanism for relative displacement of the casting matrix, the turning body and the blow matrix and for rotation of the turning body, including a toothed rack and a control curve assembly operatively and mechanically connected between the displaceable blow matrix and the turning body, so that the turning body is rotated due to the displacement of the blow matrix.

2. An injection blow tool as defined in claim 1, wherein said turning body is turnable by a turning angle of $2 \times 90°$.

3. An injection blow tool as defined in claim 1, wherein said casting matrix is provided at two opposite sides with said casting molds, said turning body which supports at least one of said mold cores and also one of said blowing matrixes being associated with each of said sides.

4. An injection blow tool as defined in claim 1; and further comprising a supporting frame exchangeable mountable on an injection machine, said displaceable turning body and said blow matrixes together with at least one stationary casting matrix are arranged on said supporting frame.

5. An injection blow tool as defined in claim 1, wherein said turning body is movable to a workpiece withdrawable position which is turned by 90° relative to said casting matrix.

6. An injection blow tool as defined in claim 1, wherein said turning body is movable to a workpiece withdrawable position which is turned by 90° relative to said blow matrix.

7. An injection blow tool as defined in claim 1, wherein said blow matrixes are turnable from their blow position to a workpiece withdrawal position by at least 90°.

8. An injection blow tool as defined in claim 1, wherein said turning body is formed as a beam which is turnable about its longitudinal axis and provided at each of its opposite sides with a row of said mold cores.

9. An injection blow tool as defined in claim 1, wherein said mold cores are electrically heatable.

10. An injection blow tool as defined in claim 1, wherein said mold cores are composed of at least two parts which are displaceable relative to one another for pre-orienting of workpieces.

11. An injection blow tool as defined in claim 1, wherein said casting molds are insertable in said casting matrix in an exchangeable manner.

12. An injection blow tool as defined in claim 1, wherein said blow molds are insertable in said blow matrix in an exchangeable manner.

13. An injection blow tool as defined in claim 1, wherein said casting molds are partially formed by sliders.

14. An injection blow tool as defined in claim 13, wherein said blow molds are also at least partially formed by sliders.

15. An injection blow tool as defined in claim 1, wherein said blow molds are partially formed by sliders.

16. An injection blow tool as defined in claim 1, wherein said casting molds are formed as openable molds with mold parts movable away of one another.

17. An injection blow tool as defined in claim 16, wherein said blow molds are also formed as openable molds with mold parts movable away of one another.

18. An injection blow tool as defined in claim 1, wherein said blow molds are formed as openable molds with mold parts movable away of one another.

19. An injection blow tool as defined in claim 1, wherein each of said turning bodies is provided on its periphery with two of said casting matrixes offset relative to one another by 90° and two of said blow matrixes offset relative to one another by 90°.

20. An injection blow tool as defined in claim 1, wherein said control curve assembly comprises a curved plate being displaceable in view of the turning bodies and containing a control curve, and a roller being fixed to the toothed rack engaging a toothed pinion fixedly mounted to the turning body, thereby causing that a displacement of the curved plate effects a lateral movement of the toothed rack and thereby rotation of the turning body.

* * * * *